US006564068B1

(12) United States Patent
Marsan

(10) Patent No.: US 6,564,068 B1
(45) Date of Patent: May 13, 2003

(54) METHOD AND APPARATUS FOR PROVIDING A COMMUNICATION SERVICE TO A COMMUNICATION UNIT IN A WIRELESS COMMUNICATION SYSTEM WITH OVERLAPPING COVERAGE AREAS

(75) Inventor: Mark J. Marsan, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/346,802

(22) Filed: Jul. 2, 1999

(51) Int. Cl.⁷ .................................................. H04Q 7/20

(52) U.S. Cl. .................. 455/525; 455/566; 455/452

(58) Field of Search ................................ 455/525, 524, 455/436, 452, 566

(56) References Cited

U.S. PATENT DOCUMENTS 6,167,283 A * 12/2000 Korpela et al. ............. 455/525
6,295,450 B1 * 9/2001 Lyer et al. .................. 455/436

OTHER PUBLICATIONS

S. Wasserberg et al., "Method For A Radio To Find An Available Channel." US patent application No. 08/811,752, Motorola Attorney Docket No. CM02887H. Filed Mar. 6, 1997, pp. 1–13.

* cited by examiner

Primary Examiner—Daniel Hunter
Assistant Examiner—Alan T. Gantt
(74) Attorney, Agent, or Firm—Jeffrey K. Jacobs

(57) ABSTRACT

The present invention addresses the need for an apparatus and method for providing a communication service to a communication unit (112) with acceptable audio quality, when a serving site (109) does not have sufficient resources. To obtain the required communication resources, base sites (106–108) whose wireless coverage areas overlap the serving base site are considered. Before selecting an alternate base site to provide the communication service, the present invention, in contrast to the prior art, determines whether the alternate base site is capable of providing the communication service to the communication unit with an acceptable level of quality. If it is, the alternate base site is selected to provide the communication service to the communication unit.

20 Claims, 2 Drawing Sheets

METHOD AND APPARATUS FOR PROVIDING A COMMUNICATION SERVICE TO A COMMUNICATION UNIT IN A WIRELESS COMMUNICATION SYSTEM WITH OVERLAPPING COVERAGE AREAS

FIELD OF THE INVENTION

The present invention relates generally to communication systems and, in particular, to providing communication services to communication units in wireless communication systems with overlapping coverage areas.

BACKGROUND OF THE INVENTION

In wireless communication systems, service requests, such as call requests, made by a communication unit to a base site providing service to the communication unit can be blocked if the base site does not have sufficient resources to support the service. Some wireless systems, such as analog cellular systems, provide a directed retry feature to address this problem. In wireless systems in which the wireless coverage areas of base sites significantly overlap, directed retry directs the service request to a neighboring base site. Thus, when a communication unit's serving site does not have sufficient resources but a neighboring site does, the communication unit can obtain communication service from the neighboring base site rather than being blocked by the serving site.

A shortcoming of directed retry, however, is that the communication service provided by the neighboring base site may have poor or insufficient audio quality. For example, a call request is granted by a neighboring base site, but the audio quality is so poor that the user must often repeat herself, end the call in frustration, or redial after the call is dropped by the system. Thus, a need exists for an apparatus and method for providing a communication service to a communication unit with acceptable audio quality, when a serving site does not have sufficient resources.

DESCRIPTION OF A PREFERRED EMBODIMENT

Figure 1:
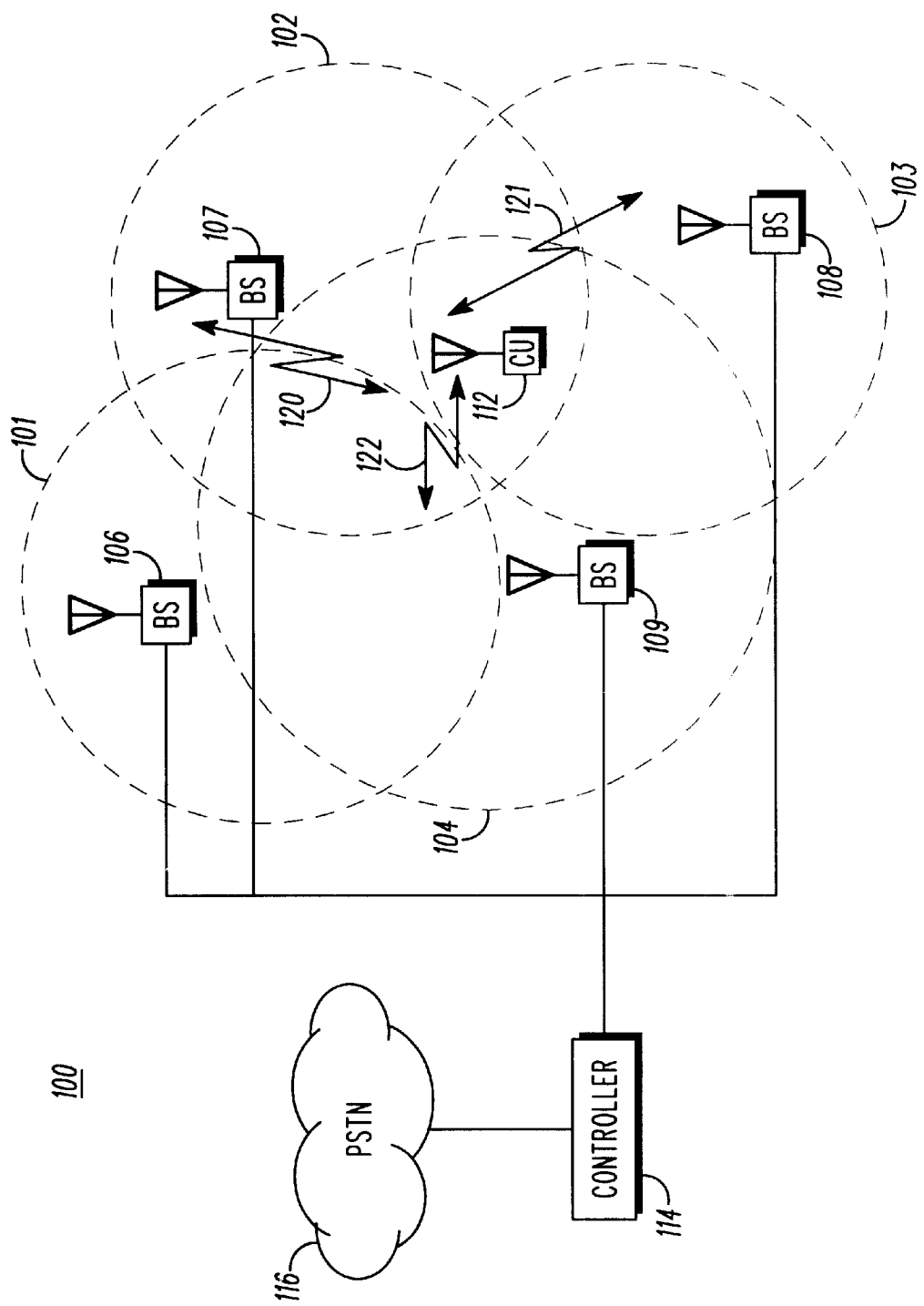
FIG. 1 is a block diagram depiction of a communication system in accordance with a preferred embodiment of the present invention.

The present invention addresses the need for an apparatus and method for providing a communication service to a communication unit with acceptable audio quality, when a serving site does not have sufficient resources. To obtain the required communication resources, base sites whose wireless coverage areas overlap the serving base site are considered. Before selecting an alternate base site to provide the communication service, the present invention, in contrast to the prior art, determines whether the alternate base site is capable of providing the communication service to the communication unit with an acceptable level of quality. If it is, the alternate base site is selected to provide the communication service to the communication unit.

The present invention encompasses a method for communication infrastructure equipment to provide a communication service to a communication unit, the communication infrastructure equipment comprises a first base site and at least one overlapping base site, wherein a coverage area of each of the overlapping base sites overlaps with a coverage area of the first base site. The communication infrastructure equipment receives a service request for the communication service from the communication unit via the first base site. The communication infrastructure equipment determines whether a communication resource of a type that is required to provide the communication service is available at the first base site. When a communication resource of the type is not available at the first base site, the communication infrastructure equipment selects an alternate base site, from the overlapping base sites, that has a communication resource of the type available and is capable of providing the communication service to the communication unit with an acceptable level of quality. The communication infrastructure equipment then provides the communication service to the communication unit using a communication resource of the type at the alternate base site.

Additionally, the present invention encompasses a method for communication infrastructure equipment to provide a communication service to a communication unit, the communication infrastructure equipment comprising a plurality of base sites. The communication infrastructure equipment receives a service request for the communication service from the communication unit via a first base site and determines whether a communication resource of a type that is required to provide the communication service is available at the first base site. When a communication resource of the type is not available at the first base site, the communication infrastructure equipment receives a list of base sites from which the communication unit receives signaling with a level of signal quality that would be acceptable for providing the communication service. The communication infrastructure equipment then provides the communication service to the communication unit using a communication resource of the type at a base site in the list received.

The present invention also encompasses a wireless communication system apparatus that comprises communication infrastructure equipment. The communication infrastructure equipment comprises a first base site and at least one overlapping base site, wherein a coverage area of each of the overlapping base sites overlaps with a coverage area of the first base site. The communication infrastructure equipment is capable of receiving a service request for a communication service from a communication unit via the first base site and determining whether a communication resource of a type that is required to provide the communication service is available at the first base site. When a communication resource of the type is not available at the first base site, the communication infrastructure equipment is capable of selecting an alternate base site, from the overlapping base sites, that has a communication resource of the type available. Further, the communication infrastructure equipment is capable of providing the communication service to the communication unit at an acceptable level of quality and providing the communication service to the communication unit using a communication resource of the type at the alternate base site.

Figure 2:
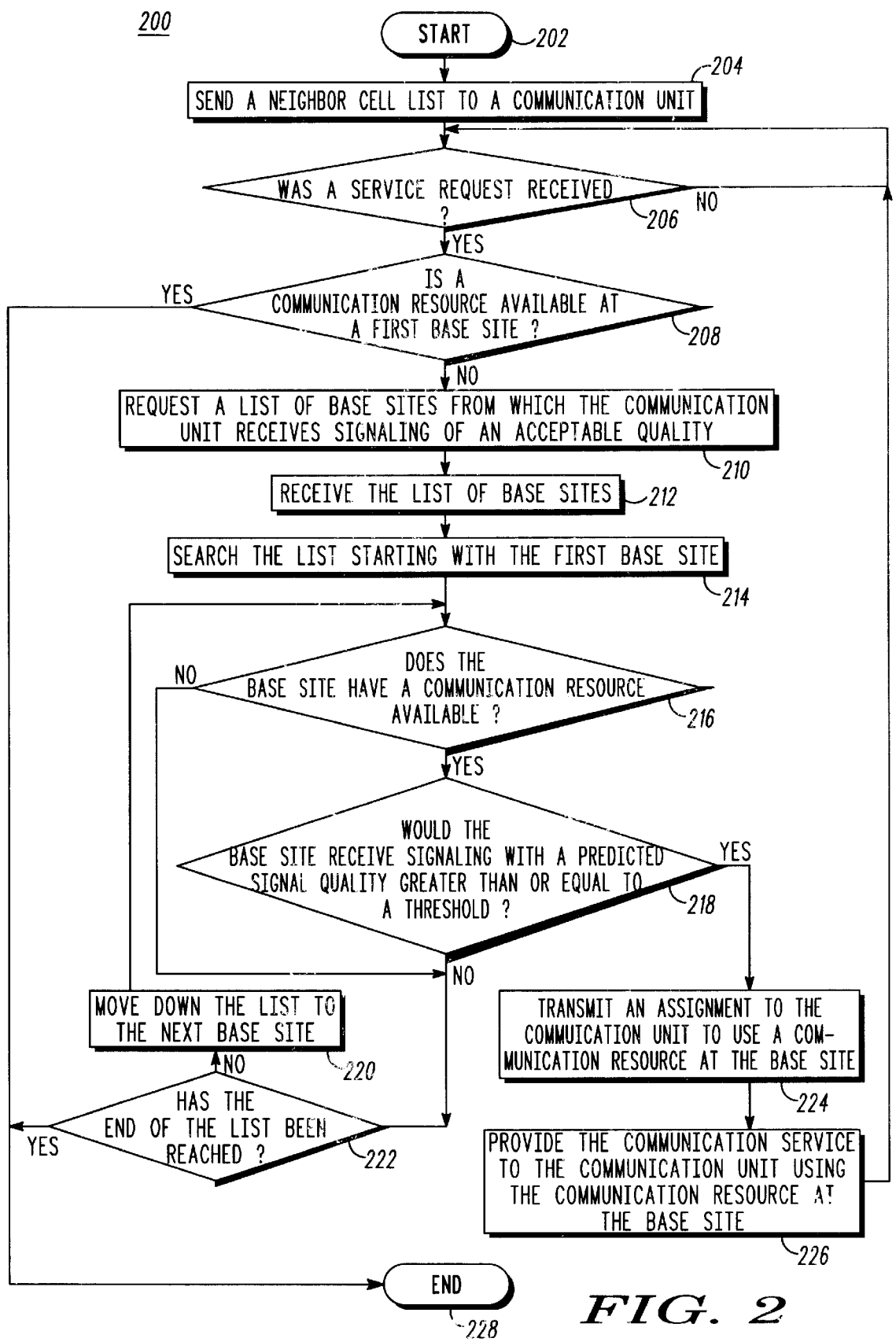
FIG. 2 is a logic flow diagram of steps executed by communication infrastructure equipment in accordance with a preferred embodiment of the present invention.

The present invention can be more fully understood with reference to FIGS. 1 and 2. FIG. 1 is a block diagram depiction of a communication system 100 in accordance with a preferred embodiment of the present invention. The preferred communication system 100 comprises a communication unit (CU) 112, communication infrastructure equipment, and a public switched telephone network (PSTN) 116. The communication infrastructure equipment comprises base sites 106–109 with wireless coverage areas 101–104, respectively, and a controller 114. In the preferred embodiment, the communication system 100 comprises an "iDEN" communication system that is commercially available from Motorola, Inc. of Schaumburg, Illinois. Accordingly, the communication unit 112 preferably comprises an "iDEN" radiotelephone, and the communication infrastructure equipment, preferably "iDEN" infrastructure equipment, comprises "iDEN" Enhanced Base Transceiver System sites (EBTSs) for base sites 106–109 and an "iDEN" Base Site Controller (BSC) for controller 114. In practice, the controller 114 typically communicates with one or more switches, one or more other controllers, and other infrastructure equipment not shown. Also in practice, communication system 100 comprises numerous communication units throughout the coverage area of system 100. It is for the purpose of simplicity that system 100 is illustrated in a limited fashion in FIG. 1.

Operation of the preferred communication system 100 in accordance with the present invention, occurs substantially as follows. The wireless coverage areas 101–103 of the base sites 106–108 all overlap the wireless coverage area 104 of base site 109. For the purpose of illustration, the communication unit 112 is shown in FIG. 1 to be located within the wireless coverage areas 102–104 but not within the wireless coverage area 101. Thus, the communication unit 112 is able to receive signaling from base sites 107–109, via wireless air interfaces 120–122, but is not able to receive wireless signaling from base site 106. The base site from which a communication unit obtains communication services is referred to as the serving site of the communication unit. Consider, then, for the purpose of illustration, that the base site 109 is the serving site of the communication unit 112.

The base site 109 receives a service request for a communication service from the communication unit 112 via the wireless interface 124. The service request may, for example, comprise a call request for an interconnect service connecting the communication unit 112 to a wireline telephone. The communication infrastructure equipment determines whether a communication resource of a type that is required to provide the communication service is available at the base site 109. In the preferred embodiment, the communication resource may comprise a wireless voice channel, specifically a time division multiplexed (TDM) wireless voice channel. Such a voice channel is required in the preferred embodiment to provide the interconnect service, for example. If a communication resource of the required type is available at the base site 109, then the requested communication service can be provided to the communication unit 112 by the base site 109.

When a communication resource of the required type is not available at the base site 109, the communication infrastructure equipment selects an alternate base site, from the overlapping base sites 106–108, that has a communication resource of the required type available. The communication infrastructure equipment preferably selects one of the overlapping base sites 106–108 that is capable of providing the communication service to the communication unit with a signal quality greater than or equal to either a predetermined threshold or the signal quality currently being provided to the communication unit by the base site 109, whichever is less. In the preferred embodiment, signal quality is determined by performing Signal Quality Estimate (SQE) measurements, and a predetermined threshold of 20 dB is used. Thus, if the SQE of signaling received by the communication unit 112 from a base site is greater than or equal to the SQE of signaling received by the communication unit 112 from the base site 109 or greater than or equal to 20 dB, then that base site may be selected as the alternate base site.

Preferably, the communication infrastructure equipment receives a list of base sites that contains those base sites from which the communication unit 112 receives signaling with a level of signal quality that would be acceptable for providing the communication service. The list of base sites, in the preferred embodiment, comprises those base sites with a signal quality greater than or equal to a threshold. As described above, the threshold is preferably the lesser of either a predetermined threshold or the signal quality currently being provided to the communication unit by the base site. The preferable list of base sites is ordered first according to a base site priority associated with each of the listed base sites and second according to signal strength measurements of signaling from each of the listed base sites. Base sites are given a base site priority to establish some base sites as more attractive alternate base sites than others, and the signal strength measurements preferably comprise Received Signal Strength Indication (RSSI) measurements.

The communication unit 112 preferably makes the SQE and RSSI measurements of signaling received from base sites 107–109 via wireless interfaces 120–122, respectively, and compiles a list of base sites as described above. The list of base sites includes base sites 107 and 108, assuming the SQE measurements of base sites 107 and 108 are acceptable. If base site 107 has a greater RSSI than base site 108 but base site 108 has a greater base site priority, base site 108 will be listed first since the base site list is ordered first by base site priority. Communication unit 112 transmits the resulting list of base sites to base site 109.

An alternate base site is preferably selected by the communication infrastructure equipment by searching the list of base sites to find a base site that has a communication resource of the required type available. In the preferred embodiment, the infrastructure equipment is also searching for a base site that would receive signaling from the communication unit with a predicted signal quality greater than or equal to a threshold. The infrastructure equipment searches the list of base sites in order, beginning with the first base site. The signal quality of signaling that would be received from the communication unit at a base site is predicted by measuring interference and noise at the base site and using the communication unit transmit power that the communication unit indicates in communication unit signaling.

Thus, if base site 108 has a communication resource of the required type available, base site 108 measures the interference and noise present on the available wireless voice channel and uses the indicated transmit power of communication unit 112 to predict the signal quality of signaling that would be received from communication unit 112. Base site 109, in the preferred embodiment, receives an indication of communication unit 112's transmit power and makes the information available to base site 108 for determining the predicted signal quality. The predicted signal quality of communication unit 112 signaling at base site 108 is then compared to preferably a predetermined threshold to ensure the signal quality will be acceptable. If the predicted signal quality of communication unit 112 signaling at base site 108 is greater than or equal to the threshold, the base site 108 is selected as the alternate base site, and the communication service originally requested is provided to the communication unit 112 by base site 108. Base site, 108 via controller 114 and PSTN 116, then provides interconnect service, for example, to a telephone connected to the PSTN 116.

The present invention enables communication infrastructure equipment to provide communication services to a requesting communication unit at an acceptable level of signal quality, when the serving site is without required resources. In the preferred embodiment, the signal quality of both downlink signaling, that received by the communication unit, and uplink signaling, that received by the base site, are considered. By determining signal quality of both wireless links before selecting an alternate base site to provide services, the present invention ensures that communication services are provided with acceptable signal quality. In addition, the signal quality of the communication service, an interconnect service for example, can improve when a channel becomes available on the original serving site. The communication unit, in the preferred embodiment, simply hands off to the original serving site during the interconnect call.

FIG. 2 is a logic flow diagram 200 of steps executed by communication infrastructure equipment in accordance with a preferred embodiment of the present invention. Preferably, the functionality described in FIG. 2 is distributed throughout the communication infrastructure equipment, including the base sites coupled to the controller, and preferably implemented as stored software routines that are executed by the platforms in which the software is stored.

The logic flow begins (202) when the communication infrastructure equipment notifies the communication unit of the identity of any base sites whose wireless coverage areas potentially overlap that of the base site currently serving the communication unit. In the preferred embodiment, the communication infrastructure equipment sends (204) a neighbor site list to the communication unit that comprises frequencies and color codes of neighboring, and therefore, potentially overlapping sites. The frequencies and color codes uniquely identify the sites to the communication unit. Since frequencies are typically reused throughout multi-site communication systems, a color code is assigned to each base site to ensure uniqueness.

When (206) the communication infrastructure equipment receives a service request for a communication service from the communication unit, the infrastructure determines (208) whether a communication resource of a type that is required to provide the communication service is available at the base site serving the communication unit. If such a resource is available, the base site preferably provides the communication service to the communication unit as is done today. The logic flow for the present invention, however, ends (228).

When such a communication resource is not available at the serving base site, the communication infrastructure equipment preferably requests (210), from the communication unit, a list of base sites from which the communication unit receives signaling with a level of quality that would be acceptable for providing the communication service. The communication infrastructure equipment receives (212) such a list of base sites. Preferably, the list of base sites is ordered first according to a base site priority associated with each of the listed base sites and second according to signal strength measurements of signaling from each of the listed base sites.

To select one of the base sites to provide the communication service to the communication unit, the communication infrastructure equipment searches (214) the list of base sites based on the ordering of the list, starting with the first base site listed. The communication infrastructure equipment determines (216) whether the first base site has a communication resource of the type that is required to provide the communication service available. If the first base site does have such a resource available, the communication infrastructure equipment then determines (218), as described above with respect to FIG. 1, whether the first base site would receive signaling from the communication unit with a predicted signal quality greater than a threshold. If so, the communication infrastructure equipment transmits (224) an assignment to the communication unit to use the available communication resource at the first base site. The communication infrastructure equipment then provides (226) the communication service to the communication unit using the available communication resource at the first base site listed. Upon the completion of the communication service, the logic flow returns to step 206 as the communication infrastructure equipment awaits the next service request.

If, at step 216, the first base site of the list did not have a required communication resource available or if, at step 218, the first base site of the list would not receive signaling from the communication unit with a predicted signal quality greater than a threshold, the communication infrastructure equipment determines (222) whether the end of the list has been reached. If it has, then there are no base sites that can provide the requested communication service to the communication unit with an acceptable level of signal quality, and the communication service request remains blocked. Thus, the logic flow for the present invention ends (228). If, instead, the end of the list has not been reached, the communication infrastructure equipment considers (220) the next base site on the list and the logic flow returns to step 216. The communication infrastructure equipment continues looping through steps 216–222 of the logic flow, each time considering the next base site listed.

Thus, the communication infrastructure equipment searches the list of base sites until a base site with an available communication resource and an acceptable predicted signal quality is found or the list is exhausted. Further, since the list of base sites is preferably ordered by base site priority and RSSI measurements, the base site selected will be the highest priority base site with the strongest signal strength of those base sites with the required resources and acceptable signal quality. The present invention, therefore, enables communication infrastructure equipment to provide communication services to communication units in a manner that utilizes overlapping coverage areas while ensuring an acceptable level of signal quality.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for communication infrastructure equipment to provide a communication service to a communication unit, the communication infrastructure equipment comprising a first base site and at least one overlapping base site, a coverage area of each of the overlapping base sites overlaps with a coverage area of the first base site, the method comprising the steps of:

receiving a service request for the communication service from the communication unit via the first base site;

determining whether a communication resource of a type that is required to provide the communication service is available at the first base site; and when a communication resource of the type is not available at the first base site:

selecting an alternate base site, from the overlapping base sites, that has a communication resource of the type available and is capable of providing the communication service to the communication unit with an acceptable level of quality; and providing the communication service to the communication unit using a communication resource of the type at the alternate base site.

2. The method of claim 1, wherein the service request comprises a call request.

3. The method of claim 1, wherein the communication resource of the type that is required to provide the communication service comprises a wireless voice channel.

4. The method of claim 3, wherein the wireless voice channel comprises a time division multiplexed (TDM) wireless voice channel.

5. The method of claim 1, further comprising the step of notifying the communication unit of the identity of the overlapping base sites.

6. The method of claim 5, wherein the step of notifying comprises the step of sending a neighbor site list to the communication unit, and wherein the neighbor site list comprises frequencies and color codes of the overlapping base sites.

7. The method of claim 1, wherein the step of selecting the alternate base site comprises the steps of:

when the threshold is less than a signal quality being provided to the communication unit, selecting one of the overlapping base sites that is capable of providing the communication service to the communication unit with a signal quality greater than or equal to a threshold; and when the signal quality being provided to the communication unit is less than the threshold, selecting one of the overlapping base sites that is capable of providing the communication service to the communication unit with a signal quality greater than or equal to the signal quality being provided to the communication unit.

8. The method of claim 1, wherein the step of selecting the alternate base site comprises the step of requesting, from the communication unit, a list of base sites from which the communication unit receives signaling.

9. The method of claim 1, wherein the step of selecting the alternate base site comprises the step of receiving a list of base sites from which the communication unit receives signaling.

10. The method of claim 9, wherein the list of base sites comprises base sites with a signal quality greater than or equal to a threshold, and wherein the list of base sites is ordered first according to a base site priority associated with each of the listed base sites and second according to signal strength measurements of signaling from each of the listed base sites.

11. The method of claim 10, wherein signal quality comprises a Signal Quality Estimate (SQE).

12. The method of claim 11, wherein the threshold is about 20 dB.

13. The method of claim 10, wherein the signal strength measurements comprise Received Signal Strength Indication (RSSI) measurements.

14. The method of claim 9, wherein the step of selecting the alternate base site further comprises the step of searching the list of base sites to find a base site that has a communication resource of the type available.

15. The method of claim 9, wherein the step of selecting the alternate base site further comprises the step of searching the list of base sites to find a base site that would receive signaling from the communication unit with a predicted signal quality greater than or equal to a threshold.

16. The method of claim 15, wherein the step of searching comprises the step of predicting a signal quality of signaling that would be received from the communication unit at a base site of the list of base sites by measuring interference and noise at the base site and using the communication unit transmit power that the communication unit indicates in communication unit signaling.

17. The method of claim 9, wherein the step of selecting the alternate base site further comprises the step of selecting one of the base sites with which to provide the communication service to the communication unit based on the ordering of the list of base sites.

18. The method of claim 1, wherein the step of providing the communication service to the communication unit comprises the step of transmitting an assignment to the communication unit to use a communication resource of the type at the alternate base site.

19. A method for communication infrastructure equipment to provide a communication service to a communication unit, the communication infrastructure equipment comprising a plurality of base sites, the method comprising the steps of:

receiving a service request for the communication service from the communication unit via a first base site;

determining whether a communication resource of a type that is required to provide the communication service is available at the first base site; and when a communication resource of the type is not available at the first base site:

receiving a list of base sites from which the communication unit receives signaling with a level of signal quality that would be acceptable for providing the communication service; and providing the communication service to the communication unit using a communication resource of the type at a base site in the list received.

20. A wireless communication system comprising:

communication infrastructure equipment that comprises a first base site and at least one overlapping base site, wherein a coverage area of each of the overlapping base sites overlaps with a coverage area of the first base site, the communication infrastructure equipment is capable of receiving a service request for a communication service from a communication unit via the first base site, determining whether a communication resource of a type that is required to provide the communication service is available at the first base site, and when a communication resource of the type is not available at the first base site, selecting an alternate base site, from the overlapping base sites, that has a communication resource of the type available and is capable of providing the communication service to the communication unit at an acceptable level of quality and providing the communication service to the communication unit using a communication resource of the type at the alternate base site.

* * * * *